(12) United States Patent
Carola et al.

(10) Patent No.: US 12,295,392 B2
(45) Date of Patent: May 13, 2025

(54) SAVOURY COMPOSITION

(71) Applicant: Conopco Inc., Englewood Cliffs, NJ (US)

(72) Inventors: Luigi Carola, Elten (DE); Tanja Grudke-Katschus, Maintal (DE); Anja Kunkel, Heilbronn (DE); Gila Seewi, Heilbronn (DE); Regine Weimar, Heilbronn (DE)

(73) Assignee: Conopco Inc., Englewood Cliffs, NJ (US)

( * ) Notice: Subject to any disclaimer, the term of this patent is extended or adjusted under 35 U.S.C. 154(b) by 184 days.

(21) Appl. No.: 17/414,339

(22) PCT Filed: Dec. 13, 2019

(86) PCT No.: PCT/EP2019/085182
§ 371 (c)(1),
(2) Date: Jun. 16, 2021

(87) PCT Pub. No.: WO2020/126938
PCT Pub. Date: Jun. 25, 2020

(65) Prior Publication Data
US 2022/0022504 A1 Jan. 27, 2022

(30) Foreign Application Priority Data
Dec. 20, 2018 (EP) .................. 18214406

(51) Int. Cl.
A23L 23/10 (2016.01)
A23L 5/00 (2016.01)
A23P 10/10 (2016.01)
A23P 30/10 (2016.01)

(52) U.S. Cl.
CPC ............ *A23L 23/10* (2016.08); *A23L 5/51* (2016.08); *A23L 5/55* (2016.08); *A23P 10/10* (2016.08); *A23P 30/10* (2016.08); *A23V 2002/00* (2013.01)

(58) Field of Classification Search
CPC ..... A23L 23/10; A23L 5/51–5/55; A23L 5/13; A23P 30/10; A23P 10/10
USPC ............... 426/91, 134, 589, 512, 573–579
See application file for complete search history.

(56) References Cited

U.S. PATENT DOCUMENTS

| | | | |
|---|---|---|---|
| 2,278,466 A | 4/1942 | Musher | |
| 2,954,296 A | 9/1960 | Clausi et al. | |
| 3,154,418 A * | 10/1964 | Lovell | A47G 21/004 206/568 |
| 3,312,555 A * | 4/1967 | Rainero, Jr. | C13B 50/02 127/65 |
| 3,336,139 A * | 8/1967 | Groncki | A23P 10/28 426/573 |
| 3,360,121 A * | 12/1967 | Zoeller | B65D 81/00 206/820 |
| 3,373,042 A | 3/1968 | Elerath et al. | |
| 3,386,837 A * | 6/1968 | Arnot | B65D 75/28 206/0.5 |
| 3,493,382 A * | 2/1970 | Edgar | A23L 29/256 426/573 |
| 3,637,398 A | 1/1972 | Elerath | |
| 3,804,960 A | 4/1974 | Barnett et al. | |
| 3,869,555 A * | 3/1975 | Heonis | A23P 10/10 426/597 |
| 4,025,657 A | 5/1977 | Cheng et al. | |
| 4,178,392 A * | 12/1979 | Gobble | A23L 7/115 426/103 |
| 4,225,627 A * | 9/1980 | Moore | A23G 3/0284 426/660 |
| 4,578,274 A | 3/1986 | Sugisawa et al. | |
| 5,589,214 A * | 12/1996 | Palm | A23L 3/0155 426/507 |
| 5,863,583 A * | 1/1999 | Altschul | A23L 7/126 426/620 |
| 6,001,408 A | 12/1999 | Dudacek et al. | |
| 6,017,388 A | 1/2000 | Yuan | |
| 6,126,979 A * | 10/2000 | Herreid | A23L 23/10 426/456 |
| 7,208,188 B2 * | 4/2007 | Sakuma | A23B 7/0205 426/385 |
| 7,794,771 B2 | 9/2010 | Kessler | |
| 11,291,226 B1 * | 4/2022 | Shah | A23P 30/36 |
| 2003/0033939 A1 | 2/2003 | Mahe et al. | |
| 2006/0233924 A1 * | 10/2006 | Nguyen | A47G 21/004 426/134 |
| 2007/0134397 A1 * | 6/2007 | Eppler | A23L 19/05 426/589 |
| 2007/0237872 A1 * | 10/2007 | Chatel | A23L 7/117 426/549 |
| 2008/0113068 A1 * | 5/2008 | Grimshaw | A23P 10/28 426/577 |
| 2008/0166459 A1 * | 7/2008 | Achterkamp | A23L 27/14 426/589 |
| 2008/0299268 A1 | 12/2008 | Achterkamp et al. | |
| 2010/0028496 A1 | 2/2010 | Barnekow et al. | |

(Continued)

FOREIGN PATENT DOCUMENTS

| | | |
|---|---|---|
| BR | 112017008935 | 3/2021 |
| CA | 964074 | 3/1975 |

(Continued)

OTHER PUBLICATIONS

Translation of EP 1214895A1 (Year: 2002).*
Anonymous; RTE FD SOUP process primary study; RTE FD SOUP process primary study; Feb. 14, 2019; Unilever Foods.
Rahman et al., Food Preservation by Freezing, Handbook of Food Preservation; 2007; 635-665.
Lewis et al., Thermal Processing, Food Processing Handbook; 2012; 31-75.

*Primary Examiner* — Drew E Becker
(74) *Attorney, Agent, or Firm* — N.V. Nederlandsch Octrooibureau

(57) ABSTRACT

The present invention relates to a savoury food article consisting of a solid, savoury composition having an elongate member extending therefrom, and also to a method for preparing such a savoury article and to the use of such a savoury article.

11 Claims, No Drawings

(56) References Cited

U.S. PATENT DOCUMENTS

| | | | |
|---|---|---|---|
| 2010/0143550 A1* | 6/2010 | Abdel-Fattah | A23L 23/10 |
| | | | 426/589 |
| 2010/0196584 A1* | 8/2010 | Dupart | A23P 30/10 |
| | | | 426/389 |
| 2011/0027429 A1 | 2/2011 | Kogane | |
| 2012/0276271 A1* | 11/2012 | Inoue | A23L 29/20 |
| | | | 426/573 |
| 2014/0017369 A1* | 1/2014 | Soquet | A23L 23/10 |
| | | | 426/589 |
| 2014/0120222 A1* | 5/2014 | Schroeder | A23P 10/28 |
| | | | 426/589 |
| 2015/0010684 A1* | 1/2015 | Gay | A23L 13/03 |
| | | | 99/441 |
| 2015/0025158 A1 | 1/2015 | Skorge et al. | |
| 2015/0204548 A1* | 7/2015 | Miller | A21B 3/04 |
| | | | 99/473 |
| 2016/0324207 A1* | 11/2016 | Briganti | A23G 3/346 |
| 2018/0192683 A1 | 7/2018 | Lane et al. | |
| 2020/0178585 A1* | 6/2020 | Mellema | A23L 27/88 |
| 2020/0345047 A1* | 11/2020 | Okada | A23L 13/428 |
| 2021/0030041 A1* | 2/2021 | Gaddipati | A23L 33/21 |
| 2022/0046975 A1* | 2/2022 | Skulec | A23L 25/30 |
| 2022/0061563 A1* | 3/2022 | Huo | A47G 21/004 |
| 2022/0095655 A1* | 3/2022 | Grudke-Katschus | A23P 30/10 |

FOREIGN PATENT DOCUMENTS

| | | |
|---|---|---|
| CN | 102665442 | 12/2010 |
| CN | 1343099 | 4/2020 |
| DE | 3538805 A1 | 5/1987 |
| EP | 0026102 A1 | 4/1981 |
| EP | 0512249 A1 | 11/1992 |
| EP | 0910957 A3 | 3/2000 |
| EP | 1216640 A1 | 6/2002 |
| EP | 1241216 A1 | 9/2002 |
| EP | 1166645 A3 | 6/2003 |
| EP | 2509449 | 10/2012 |
| EP | 3123875 | 2/2017 |
| FR | 2661317 | 10/1991 |
| JP | 2005261225 | 9/2005 |
| JP | 2009148254 A2 | 7/2009 |
| JP | 2016111972 A2 | 6/2016 |
| WO | WO0054609 | 9/2000 |
| WO | WO0247519 A1 | 6/2002 |
| WO | WO2004108767 A2 | 12/2004 |
| WO | WO2007007243 A1 | 1/2007 |
| WO | WO2007009600 | 1/2007 |
| WO | WO2011069885 | 6/2011 |
| WO | WO2012083410 A1 | 6/2012 |
| WO | WO2012119765 A1 | 9/2012 |
| WO | WO2016066383 | 5/2016 |
| WO | WO2017021069 | 2/2017 |
| WO | WO2017021073 | 2/2017 |
| WO | WO2017032685 | 3/2017 |
| WO | WO2017089174 | 6/2017 |
| WO | WO2017021071 | 9/2017 |
| WO | WO2017186514 | 11/2017 |
| WO | WO2018108431 A1 | 6/2018 |
| WO | WO2019015932 A1 | 1/2019 |

* cited by examiner

SAVOURY COMPOSITION

TECHNICAL FIELD OF THE INVENTION

The present invention relates to a savoury food article for providing a soup or broth, a method of preparing such an article and the use of such an article to prepare a savoury meal.

BACKGROUND OF THE INVENTION

Savoury compositions, such as bouillon or soup powders or bouillon or soup cubes are typically used to prepare a ready-to-eat savoury meal in the home environment (e.g. a bouillon, a soup, a sauce or a gravy). The powder or cube needs to be stirred in a container and heated to prepare the savoury meal.

Consumers desire a simple way to prepare savoury meals both at home and away from home. Outside the home, the consumer experiences several disadvantages when preparing a savoury meal from a savoury composition of the prior art. In the case of powders, the correct amount of powder needs to be added. This can be achieved by portioning the savoury composition into single-servings or adding a measured amount by e.g. a spoon from tub. However, a tub of savoury composition is not ideal as it is cumbersome and does not lend itself to easily preparing a savoury meal on-the-go.

The consumer also wants to use savoury compositions that look appealing and perceived as clean label.

Attempts have been made to overcome some of these disadvantages. For example, GB 1 019 552 describes a packaging system in the form of a spoon in which a concentrated product is arranged in the bowl of the spoon and is covered and held in place by a heat-sensitive film. Upon contact with hot water, the plastic film becomes partially or completely detached to release the soluble concentrated product.

Such a system is not ideal because a shred of plastic remains secured to the spoon or remains in the beverage, and this considerably hampers the use of the spoon or consumption of the beverage reconstituted in this way.

WO0247519 describes an assembly comprising a utensil for holding or stirring, secured to a mass of cooking aid made up of 25 to 40% of fats which are solid at ambient temperature, 20 to 70% of flavourings and 5 to 50% of binders. However, such an assembly has an unacceptable fat content for the consumer.

A further disadvantage of the WO 0247519 is that on transport the assembly is not stable. The high fat content means that the assembly is prone to fat exudation, leading to an unappetizing appearance. Also, the soft nature of the cooking aid is prone to being dented and bashed during transport, again leading to an unappetizing appearance for the consumer. Also, the high fat content leads to unsightly fat staining of the packaging.

It is an object of the present invention to provide an easy to use savoury composition that is stable under transport conditions.

It is an object of the present invention to provide a savoury composition that dissolves quickly and has an appetizing appearance.

SUMMARY OF THE INVENTION

It has been found that the objects of the present invention are met by the process described herein.

The inventors of the present invention have developed an improved process for the preparation of a savoury food article for providing a soup or broth, the process, comprising the steps of:
i) preparing a savoury composition comprising an edible salt, a fat, plant matter and a saccharide or polysaccharide;
ii) filling a mould with the savoury composition and placing an elongate member in the mould such that said elongate member extends from the mould,
iii) heating the mould containing the savoury composition and elongate member at a temperature in the range of 70 to 140° C., in the presence of moisture,
iv) cooling the moulds and removing the savoury composition and elongate member from the mould to provide a savoury food article.

In a second aspect, there is provided, a savoury food article for providing a soup or broth consisting of a solid, savoury composition having an elongate member extending therefrom wherein the savoury composition comprises:
a) 1 to 15 wt. % of an edible salt selected from sodium chloride, potassium chloride and combinations thereof, based on the total weight of the composition;
b) 1 to 25 wt. % of a fat component, based on the total weight of the composition;
c) 1 to 60 wt. % of plant matter selected from vegetables, herbs, spices and combinations thereof, based on the total weight of the composition; and
d) 1 to 25 wt. % binding agent selected from the group consisting of saccharides and polysaccharide,
e) less than 5 wt. % water, based on the total weight of the composition, wherein the sum of a), b), c) and d) constitutes at least 70 wt. % of the savoury composition.

The present invention further relates to a savoury food article consisting of a savoury composition having an elongate member extending therefrom

DETAILED DESCRIPTION OF THE INVENTION

The word 'comprising' as used herein is intended to mean 'including' but not necessarily 'consisting of' or 'composed of'. In other words, the listed steps or options need not be exhaustive.

Unless specified otherwise, numerical ranges expressed in the format 'from x to y' or 'x-y' are understood to include x and y. When for a specific feature multiple preferred ranges are described in the format 'from x to y' or 'x-y', it is understood that all ranges combining the different endpoints are also contemplated. For the purpose of the invention ambient temperature is defined as a temperature of about 20° C.

Unless indicated otherwise, weight percentages (wt. %) are based on the total weight of the composition.

The term "shape retaining savoury concentrate" as used herein means a composition that at 20° C. does not flow and retains a shape, i.e. may be a block, cube, oblong, cylinder, sphere etc.

The term "solid" as used herein means a material consisting of a network of particles that together form a shaped material. The term "solid" as used herein that may be porous.

The term "particulate" as used herein, refers to a savoury composition that consists of discrete particles, preferably discrete particles having an average particle size of at least 10 μm. Particle size distributions of particulate components can suitably be determined with a set of sieves of different mesh sizes. The average particle size as referred to herein is the volume weighted average particle size that can be measured by the skilled person using conventional methods, for example by sieve analysis.

The term 'bulk density' as used herein, unless indicated otherwise, refers to freely settled bulk density. Bulk density can be measured using the method of DIN:ISO 697:1981-03.

The term "particulate starch component" as used herein refers to material having a starch content of at least 50 wt. %. Examples of such starch components include native starch, pregelatinized starch, cereal flour and combinations thereof.

The term "elongate member" as used herein means an object made of a solid material, for example wood, plastic or metal, having at least two ends, wherein a first end is in contact with the savoury composition and a second end allows holding and/or stirring by the user.

There is provided a process for the preparation of a savoury food article for preparing a soup or broth comprising the steps of:
  i) preparing a savoury composition comprising an edible salt, a fat, plant matter and a saccharide or polysaccharide;
  ii) filling a mould with the savoury composition and placing an elongate member in the mould such that said elongate member extends from the mould,
  iii) heating the mould containing the savoury composition and elongate member at a temperature in the range of 70 to 140° C., in the presence of moisture,
  iv) cooling the moulds and removing the savoury composition and elongate member from the mould to provide a savoury food article.

Preferably, the savoury composition is provided by mixing the dry ingredients, typically the edible salt and vegetable matter with the fat, if present, in the molten state before admixing the saccharide or polysaccharide.

Preferably, the savoury composition is prepared by mixing: edible salt selected from sodium chloride, potassium chloride and combinations thereof, plant matter selected from vegetables, herbs, spices and combinations thereof, and saccharide or polysaccharide, with a fat component, said fat being in a molten state.

The mould may be any mould suitable for use with food ingredients, for example a plastic or silicon mould. Preferably a silicon mould is used. In some cases, vibration may be applied to remove the savoury composition from the mould.

Preferably, pressure is applied to the mould after step ii). Typically, pressure can be applied by placing a weight on top of the mould, preferably a weight of 1-5 kg is applied The heating is carried out in the range of 70 to 130° C., preferably in the range of 80 to 120° C., more preferably 90 to 120° C.

Preferably, wherein the moisture is provided as steam. The steam is preferably added by an oven equipped with steam injection. In other words, the heating step is preferably carried out in a heating unit with steam injection, such as a steam oven.

Preferably, the cooling in step iv) is carried by passive cooling or flash cooling, preferably passive cooling.

Preferably the cooling step is followed by a drying step to provide a savoury composition having a water content of less than 5 wt. %, by total weight of the savoury composition.

The savoury composition in contact with the elongate member is preferably present in an amount corresponding to an individual portion of a savoury meal, for example a soup, stock, or broth. In other words, in the context of the present application, the savoury composition is an edible composition for the preparation of a soup or broth. The savoury food article typically contains a savoury composition having a unit weight between 1 and 50 g, preferably between 2 and 25 g, more preferably between 3 and 22 g, and even preferably between 4 and 20 g, most preferably between 5 and 15 g.

Preferably, the savoury composition having a unit weight between 1 and 50 g, preferably between 2 and 25 g, more preferably between 3 and 22 g, and even preferably between 4 and 20 g, most preferably between 5 and 15 g is dissolved in water to give a soup or broth.

Preferably the savoury composition having a unit weight between 1 and 50 g, preferably between 2 and 25 g, more preferably between 3 and 22 g, and even preferably between 4 and 20 g, most preferably between 5 and 15 g is dissolved in 50 to 1000 mL, preferably 100 to 750 mL, more preferably between 100 and 500 mL, even more preferably between 150 and 300 mL water. The water is preferably at temperature in the range of 80 to 100° C.

Preferably, the plant matter is contained in a solid (at 20° C.), particulate matrix comprising edible salt and polysaccharide or saccharide. The plant matter may be vegetable or fruit matter. Preferably the plant matter is vegetable matter, not being limited to powdered, sliced, diced, cubed, macerated, or otherwise comminuted pieces of vegetables. It has been found that the particulate matrix enables plant matter to be distributed in an attractive way in the savoury food article.

The savoury composition preferably comprises at least 1 wt. %, more preferably at least 10 wt. % and most preferably at least 25 wt. % of plant matter, said plant matter being selected from vegetables, herbs, spices, fruit and combinations thereof, said plant material preferably having a mesh size in the range of 0.2-10 mm.

Typically, the savoury composition contains 1 to 60 wt. %, more preferably 2-55 wt. % and most preferably 5-45 wt. % of plant matter preferably having a mesh size in the range of 0.2-10 mm.

Examples of plant matter include vegetables, herbs, spices, fruit, nuts, grains, and combinations thereof. Preferably the tissue material is edible material selected from vegetables, herbs, spices and fruit.

Typically, at least 80 wt. % of the plant matter has a particle size in the range of 10-2000 µm. Even more preferably at least 80 wt. % of the plant matter has a particle size in the range of 50-1500 µm. Most preferably, at least 80 wt. % of the edible salt has a particle size in the range of 100-1000 µm.

The composition typically comprises 5-50 wt. % of meat material selected from meat pieces, meat flavour, and combinations thereof. Preferably, the composition comprises 10-40 wt. %, even more preferably 15-30 wt. % of meat material. Preferably at least 80 wt. % of said particulate meat material passes a sieve with apertures of 2000 µm.

Salt Preferably, the composition comprises 1-15 wt. %, more preferably 2-10 wt. %, even more preferably 3-8 wt. %, of the edible salt, selected from sodium chloride, potassium chloride and combinations thereof. Preferably the edible salt is sodium chloride. Preferably, sodium chloride represents at least 50 wt. %, more preferably at least 80 wt. % and most preferably at least 98 wt. % of said edible salt.

The edible salt which is employed in accordance with the invention preferably has a mass weighted average diameter in the range of 10-2000 μm, more preferably in the range of 100-1200 μm, and most preferably in the range of 200-800 μm.

Typically, at least 80 wt. % of the edible salt has a particle size in the range of 10-2000 μm. Even more preferably at least 80 wt. % of the edible salt has a particle size in the range of 50-1500 μm. Most preferably, at least 80 wt. % of the edible salt has a particle size in the range of 100-1000 μm.

Fat

Preferably, the composition comprises 1.5-20 wt. %, of a fat component, preferably 2-15 wt. % of a fat component, even more preferably 2.5-10 wt. % of a fat component, based on the total weight of the composition.

Fat may be present in the savoury composition as defined herein in relatively low amounts. Fat can be liquid fat or solid fat, preferably liquid fat, at ambient temperature, such as for example at 20° C. It can preferably be a fat selected from the group consisting of palm oil, sunflower oil, olive oil, rape seed oil and mixtures thereof. It can be a vegetable fat or an animal fat. Higher amounts are preferably prevented as they may interfere with the proper texture of the savoury article or may result in fat staining packaging during storage or transport or in usage. Relatively high amounts of solid fat, such as e.g. saturated or hydrogenated fats may affect the desired texture, and therefore are not preferred. Relatively high amounts of liquid fat, such as for example oils which are liquid at room temperature, may have a weakening effect on the texture of the savoury food article. Hence, preferably, the present invention relates to a savoury composition further comprising less than 20 wt. % of fat, preferably less than 15 wt. %, more preferably less than 10 wt. %, even more preferably less than 5 wt. % of fat.

Preferably, fat may be present in an amount of from 0.5 to 15 wt. % of fat, more preferably of from 1 to 10 wt. % of fat, most preferably of from 3 to 10 wt. % of fat, based on the weight of the savoury composition. It may be preferred that fat is absent. It is particularly preferred that the amount of solid fat at 20° C. is less than 10 wt. %, preferably less than 5 wt. %, even more preferably less than 1 wt. %, based on the total weight of the composition.

The total fat, preferably present in an amount as indicated in the paragraph here above, preferably has a solid fat content at 20° C. (N20) of 0 to 20%, preferably 1 to 15%.

The saccharide or polysaccharide binding agent is preferably glucose or a glucose containing polysaccharide. Preferably the saccharide or polysaccharide is selected from the group consisting of glucose and maltodextrin.

Preferably, the saccharide is glucose. Glucose is a monosaccharide. Preferably, glucose is present in an amount of 2 to 20 wt. %, based on the total weight of the composition, preferably 5 to 15 wt. %, even more preferably 7 to 12 wt. %, based on the total weight of the composition.

Preferably, the polysaccharide is maltodextrin. Preferably, maltodextrin is present in an amount of 2 to 20 wt. %, based on the total weight of the composition, preferably 5 to 15 wt. %, even more preferably 7 to 12 wt. %, based on the total weight of the composition. Maltodextrin consists of D-glucose units connected in chains of variable length. The glucose units are primarily linked with α(1→4) glycosidic bonds. Maltodextrin is typically composed of a mixture of chains that vary from three to 17 glucose units long.

Maltodextrins are classified by DE (dextrose equivalent) and have a DE between 3 and 20. The higher the DE value, the shorter the glucose chains, the higher the sweetness, the higher the solubility, and the lower heat resistance.

The composition typically comprises 5-60 wt. % of plant and/or meat matter selected from meat pieces, meat flavour, herbs, spices, vegetables and combinations thereof. Preferably, the composition comprises 10-50 wt. %, even more preferably 15-40 wt. % of the plant and/or meat material. Preferably at least 80 wt. % of said particulate plant and meat material passes a sieve with apertures of 2000 μm.

The savoury composition, preferably has a water content of less than 10 wt. %, by weight of the savoury composition, preferably less than 7.5 wt. %, more preferably less than 5 wt. %, even more preferably less than 2.5 wt. %, most preferably less than 2 wt. %. The water content may be determined by standard methods, for example DIN 10236: 2001-12, PV01441, graviometry.

The composition preferably comprises, by weight of the composition, 1-30 wt. %, preferably 2-20 wt. %, more preferably 5 to 1 10, wt. % of savoury taste giving ingredients, selected from glutamate, 5'-ribonucleotides, sucrose, glucose, fructose, lactic acid, citric acid and combinations thereof. Sucrose, glucose and fructose are preferably present in the savoury composition in a total amount of 0 to 10 wt. %, more preferably 1 to 4 wt. %, even more preferably 1.5 to 2.5 wt. %, based on the weight of the savoury composition.

Glutamate, for example monosodium glutamate, is preferably present in the savoury composition in an amount of 0 to 5 wt. %, more preferably 1 to 3 wt. %, based on the weight of the savoury composition.

Preferably, edible acids selected from the group of lactic acid, citric acid and combinations thereof, are present in the composition in an amount of 0 to 10 wt. %, more preferably 1 to 4 wt. %, even more preferably 1.5 to 2.5 wt. %, based on the weight of the savoury composition.

The savoury taste ingredients may be added as such or as part of a complex ingredient mixture. In a preferred embodiment, one or more of the savoury taste giving ingredients are provided by ingredients selected from the group consisting of yeast extract, hydrolysed vegetable protein, dry meat extract, dry spices, herbs and mixtures thereof.

The savoury composition according to the invention preferably comprises 0 to 5 wt. %, more preferably 0.1 to 1 wt. %, or even 0.5 to 2 wt. %, dry meat extract, based on the weight of the savoury composition.

The total amount of edible salt, plant matter and savoury taste giving ingredients in the savoury composition is preferably 20 to 90 wt. %, preferably 30 to 80 wt. %, even more preferably 40 to 70 wt. %, based on the weight of the savoury composition. It is especially preferred that the total amount edible salt, plant matter and savoury taste giving ingredients in the savoury composition is higher than that of the other non-fat ingredients, like fillers, flavour ingredients and water.

Preferably, the savoury composition comprises comprising 2 to 35 wt. % of starch components selected from native starches, wherein the native starch is preferably selected from the group consisting of corn starch, potato starch, tapioca starch, waxy corn starch, waxy rice starch, and wheat starch and combinations thereof.

The savoury composition preferably comprises less than 1 wt. % native starch selected from corn starch, potato starch, tapioca starch, waxy corn starch, waxy rice starch, wheat flour and wheat starch and combinations thereof.

The Savoury composition preferably comprises less than 5 to 25 wt. % native starch and comprises less than 1 wt. %, preferably 0 wt. %, maltodextrin Surprisingly it has been found that maltodextrin can be dispensed with when the binding agent is native starch.

The savoury composition may also comprise a non-gelatinized starch, preferably selected from the group consisting of corn starch, potato starch, tapioca starch, waxy corn starch, waxy rice starch, and wheat starch.

Non-gelatinzed starch may be a physically modified, enzymatically modified or chemically modified starch. "Physically modified starch" means a starch which has been subjected to a heat treatment in the presence of relatively small amounts of water or moisture. No other reagents are added to the starch during the heat treatment. The heat-treatment processes include heat-moisture and annealing treatments, both of which cause a physical modification of starch without any gelatinization, damage to granular integrity, or loss of birefringence (Miyazaki et al., Trends in Food Science & Technology 17 (2006) p. 591-599). Annealing represents 'physical modification of starch slurries in water at temperatures below gelatinisation' whereas heat-moisture treatment 'refers to the exposure of starch to higher temperatures at very restricted moisture content (18-27%)'. (Tester et al., International Journal of Biological Macromolecules 27(2000) p. 1-12). Physical modification should be distinguished from gelatinisation of starch, which usually is carried out by heating starch in an excess amount of water. Other terms which are used for this type of starch are "heat-treated starch" and "heat-modified starch".

"Enzymatically modified starch" means a starch which has been treated with one or more enzymes to modify its properties.

"Chemically modified starch" means a starch which has been reacted with reagents which have been added to the starch in order to form new covalent bonds between those molecules and the starch molecules.

Typically, the savoury composition comprises:
a) 2 to 5 wt. % of an edible salt selected from sodium chloride, potassium chloride and combinations thereof, based on the total weight of the composition;
b) 1 to 10 wt. % of a fat component, based on the total weight of the composition;
c) 10 to 55 wt. % of plant matter selected from vegetables, herbs, spices and combinations thereof, based on the total weight of the composition; and
d) 5 to 20 wt. % binding agent selected from the group consisting of saccharides and polysaccharide,
e) less than 5 wt. % water, based on the total weight of the composition, wherein the sum of a), b), c) and d) constitutes at least 80 wt. % of the savoury composition.

Preferably, the savoury composition comprises:
a) 2 to 5 wt. % of an edible salt selected from sodium chloride, potassium chloride and combinations thereof, based on the total weight of the composition;
b) 1 to 10 wt. % of a fat component, based on the total weight of the composition;
c) 10 to 55 wt. % of plant matter selected from vegetables, herbs, spices and combinations thereof, based on the total weight of the composition; and
d) 5 to 20 wt. % binding agent selected from the group consisting of saccharides and polysaccharide,
e) less than 5 wt. % water, based on the total weight of the composition,
f) 1-20% proteinaceous matter.
wherein the sum of a), b), c) and d) constitutes at least 80 wt. % of the savoury composition The savoury food article typically has a unit weight between 1 and 50 g, preferably between 2 and 25 g, more preferably between 3 and 22 g, and even preferably between 4 and 20 g, most preferably between 5 and 15 g.

Preferably, the savoury composition has a water activity of less than 0.8, preferably less than 0.65, more preferably less than 0.5, even more preferably less than 0.4, more preferably less than 0.3 and preferably more than 0.15

Amounts, preferred amounts, ingredients and preferred ingredients etcetera as specified for the product apply also for the process, mutatis mutandis, unless specified otherwise.

In a third aspect, the present invention relates to a savoury food article as defined herein obtainable by a process defined herein. Preferably, the savoury food article for preparing a soup or broth consisting of a solid, savoury composition having an elongate member extending therefrom is obtainable by a process as defined herein. More preferably, the savoury food article for preparing a soup or broth consisting of a solid, savoury composition having an elongate member extending therefrom is obtainable by a process as defined herein, wherein the savoury composition comprises, by total weight of the composition:
a) 1 to 15 wt. % of an edible salt selected from sodium chloride, potassium chloride and combinations thereof, based on the total weight of the composition;
b) 1 to 25 wt. % of a fat component, based on the total weight of the composition;
c) 1 to 60 wt. % of plant matter selected from vegetables, herbs, spices and combinations thereof, based on the total weight of the composition; and
d) 1 to 25 wt. % binding agent selected from the group consisting of saccharides and polysaccharides,
e) less than 5 wt. % water, based on the total weight of the composition, wherein the sum of a), b), c) and d) constitutes at least 70 wt. % of the savoury composition.

The savoury article as defined herein is preferably packaged. The present invention therefore relates in an aspect to a packaged savoury food article for preparing a soup or broth consisting of a solid, savoury composition having an elongate member extending therefrom, wherein the savoury composition comprises, by total weight of the composition:
a) 1 to 15 wt. % of an edible salt selected from sodium chloride, potassium chloride and combinations thereof, based on the total weight of the composition;
b) 1 to 25 wt. % of a fat component, based on the total weight of the composition;
c) 1 to 60 wt. % of plant matter selected from vegetables, herbs, spices and combinations thereof, based on the total weight of the composition; and
d) 1 to 25 wt. % binding agent selected from the group consisting of saccharides and polysaccharides,
e) less than 5 wt. % water, based on the total weight of the composition, wherein the sum of a), b), c) and d) constitutes at least 70 wt. % of the savoury composition.

The packaged savoury food article is preferably contained in a wrapper. The wrapper may be any suitable food grade wrapper, for example a transparent, translucent or opaque packaging film. The packaging may contain one or more savoury food articles. Preferably, a packaging unit comprises at least one, preferably at least two savoury food articles as defined herein.

In another aspect, the present invention relates to a method for preparing a savoury meal comprising contacting a savoury food article as defined herein with water having a temperature of at least 80° C.

In yet another aspect, the present invention relates to the use of a savoury food article according as defined herein for preparing a savoury meal, preferably a soup or broth.

EXAMPLES

Example 1

Savoury compositions were prepared according to the recipe in table 1.

TABLE 1

| Ingredient | 1 | 2 | 3 |
|---|---|---|---|
| Salt (crystalline) | 4.5 | 7.5 | 2.5 |
| sucrose (crystalline) | 13.5 | 1.23 | 3.5 |
| Vegetable powder[1] & herbs | 32 | 14.41 | 31 |
| Yeast | 3.0 | 4.04 | 18.5 |
| Creamer[a] | 5.5 | 20.76 | 19 |
| Liquid fat | 2.5 | 0.23 | 1.5 |
| Potato starch | 5.5 | 28.83 | 21.5 |
| Maltodextrin | 13.5 | 0 | 0 |
| Glucose syrup dried DE 26-30 | 0 | 17.39 | 0 |
| Solid Fat | 20 | 1 | 0 |
| Savoury taste giving ingredients | 0 | 4.61 | 2.5 |

[a]75% fat:
[1]vegetable powder in composition 1: tomato; 2: mushroom; 3: pumpkin First a base mix of salt, vegetable powder, yeast, creamer, fat powder, herbs and potato starch were mixed together in a Thermomix (Thermomix 31-1 highest speed 10.700/min).

A silicon mould was filled with a savoury composition of Table 1, sample 1. A wooden stick was placed in the composition so that the stick extended from the mould. The mould was covered with a complementary mould, pressed and heated in a Convectormat (with or without injection of steam) according to Table 2. Heating took place for 6 minutes at the temperature indicated. Thereafter, the savoury food article was cooled and removed from the mould.

TABLE 2

| Sample | Temperature | Steam | Result |
|---|---|---|---|
| 2.1 | 70° C. | Yes | Solid product |
| 2.2 | 90° C. | No | No product formed |
| 2.3 | 90° C. | Yes | Solid product |
| 2.4 | 110° C. | Yes | Solid product |
| 2.5 | 120° C. | No | No product; |

Example 3

A savoury food article according to the invention (sample 1) was prepared as above and a dissolution test carried out in comparison with a savoury food article according to WO0247519 (composition A). Composition A was prepared according to Example 1 and 3 of WO0247519.

TABLE 4

| Ingredient | A Wt. % |
|---|---|
| Salt | 5.1 |
| Sugar | 6.2 |
| Vegetable powder[1] & herbs | 23 |
| Solid Fat | 34 |
| Potato starch & wheat flour | 30.8 |

The savoury articles 1 and A were placed in a mugs. Water was boiled in a kettle. The required amount of water (200 ml) was measured into a measuring cup, and from there transferred into each of the mugs respectively. The savoury food articles were held by the stick and stirred until dissolved.

TABLE 5

| Savoury article | Dissolution time | Appearance |
|---|---|---|
| 1 | 60 secs | No fat eyes |
| A | 99 secs | Fat eyes |

Savoury article 1 was visually appealing prior to placing in hot water, dissolved quickly and did not produce fat eyes meaning the resultant soup was also visually appealing.

The invention claimed is:

1. A process for the preparation of a savoury food article for providing a soup or broth, comprising the steps of:
   i) preparing a savoury composition comprising an edible salt, a fat, plant matter and a saccharide or polysaccharide;
   ii) filling a mould with the savoury composition and placing an elongate member in the mould such that said elongate member extends from the mould,
   iii) heating the mould containing the savoury composition and elongate member at a temperature in the range of 70 to 140° C. in a steam oven with steam injection, and
   iv) cooling the mould and removing the savoury composition and elongate member from the mould to provide a savoury food article,
   wherein the cooling is followed by drying of the savoury composition to a water content of less than 5 wt. % by total weight of the savoury composition.

2. The process according to claim 1, wherein the savoury composition comprises:
   a) 1 to 15 wt. % of an edible salt selected from sodium chloride, potassium chloride and combinations thereof, based on the total weight of the composition;
   b) 1 to 25 wt. % of a fat component, based on the total weight of the composition;
   c) 1 to 45 wt. % of plant matter selected from vegetables, herbs, spices and combinations thereof, based on the total weight of the composition; and
   d) 1 to 30 wt. % saccharide or polysaccharide.

3. The process according to claim 1, wherein the heating is carried out in the range of 70 to 130° C.

4. The process according to claim 1, wherein the cooling in step iv) is carried out by passive cooling.

5. The process according to claim 1, wherein the cooling in step iv) is carried out by flash cooling.

6. The process according to claim 2, comprising 2 to 35 wt. % of starch components selected from native starches.

7. The process according to claim 2, wherein the saccharide or polysaccharide is glucose or a glucose containing polysaccharide.

8. The process according to claim 2, wherein the savoury composition has a water content of less than 4.5 wt. %.

9. The process according to claim 6, wherein the native starches are selected from corn starch, potato starch, tapioca starch, waxy corn starch, waxy rice starch, wheat starch, and combinations thereof.

10. The process according to claim 1, wherein the savoury composition has a water activity of less than 0.5.

11. The process according to claim 1, wherein the savoury composition having a unit weight between 1 and 50 g is dissolvable in 50 to 1000 mL water at temperature in the range of 80 to 100° C.

* * * * *